INVENTORS
JOSEPH CHIN JUNG CHENG
WILLIAM EARL McKINLEY

United States Patent Office 3,452,421
Patented July 1, 1969

3,452,421
FRICTION WELDING OF DISSIMILAR MATERIALS
Joseph Chin Jung Cheng, Norwalk, and William Earl McKinley, Springdale, Conn., assignors, by mesne assignments, to Caterpillar Tractor Co., Peoria, Ill., a corporation of California
Filed Mar. 13, 1964, Ser. No. 351,653
Int. Cl. B23k 27/00
U.S. Cl. 29—470.3          5 Claims

ABSTRACT OF THE DISCLOSURE

In the process of friction welding dissimilar workpieces, a collet of heat conducting material is placed in contact with the workpiece which tends to produce a greater amount of upset adjacent the interface for the two workpieces to act as a heat sink and achieve a stronger friction weld.

---

This invention relates in general to friction welding, and, more particularly, to the friction welding of dissimilar materials.

An object of this invention is to provide a method and apparatus for making stronger friction welds between workpieces of dissimilar materials.

Another object of this invention is to reduce the amount of upset produced when friction welding dissimilar materials.

Many other objects, advantages and features of invention reside in the particular construction, combination and arrangement of parts involved in this invention and its practice as will be understood from the following description and accompanying drawing wherein.

Figure 1:
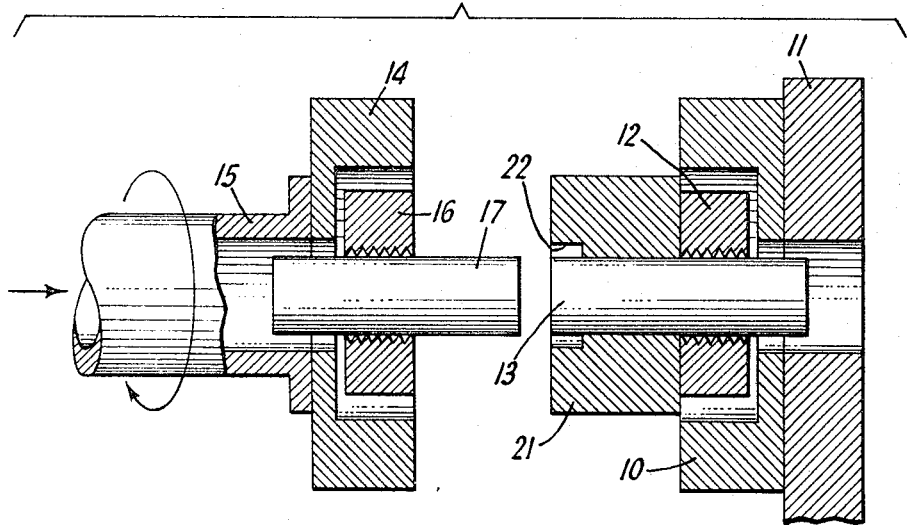
FIGURE 1 is a longitudinal section through a rotatably mounted chuck and fixed chuck having workpieces secured therein prior to friction welding, one workpiece having an upset controlling collet according to this invention placed over it and shown in longitudinal section.

Referring to the drawing in detail, FIGURE 1 shows a stationary chuck 10 mounted on a fixed member 11 and having the jaws 12 securing a workpiece 13. A rotatably mounted chuck 14 is fixed on the hollow shaft 15 to rotate with it while being advanced toward chuck 11. Chuck 14 has the jaws 16 securing the workpiece 17.

If workpiece 17 is of copper and workpiece 13 is of aluminum, the workpieces may be conventionally friction welded by rapidly rotating the workpieces relative to each other and forcing them together. As heat of friction builds up in the weld area or area of contact between the workpieces, the relative rotation is brought to a stop as the workpieces are continued to be forced together. The heat of friction in the weld area renders the workpieces plastic so that, after the relative rotation ceases, a weld is made between them.

Figure 2:
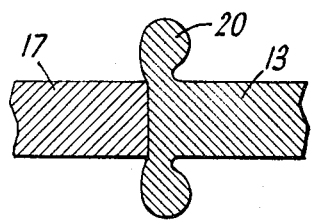
FIGURE 2 is a longitudinal section through fragments of two workpieces of dissimilar materials after they have been conventionally friction welded.

As shown in FIGURE 2, when a copper workpiece 17 is friction welded to an aluminum workpiece 13, the greater heat conductivity of the copper workpiece 17 conducts heat rapidly from the weld area. Most of the upset 20 flows from the weaker aluminum workpiece 13.

The great flow of upset from the aluminum workpiece 13 is undesirable as it results in a waste of material. The more rapid flow of the aluminum workpiece 13 reduces the effective welding pressure about the periphery of the weld area. After accomplishing a conventional friction weld between such dissimilar materials, there is a relatively wide heat affected zone on the aluminum side of the weld area.

Figure 3:
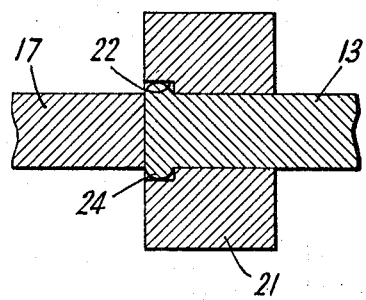
FIGURE 3 is a longitudinal section through fragments of two workpieces of dissimilar materials and an upset controlling collet after the workpieces have been friction welded according to this invention.

As shown in FIGURES 1 and 3, a collet 21 is placed about the end of the aluminum workpiece 13. Collet 21 has an annular internal cutout 22 formed about the end of workpiece 13. Collet 21 should be made of a material with a high heat capacity, i.e., a high specific heat and a high density. Collet 21 should also be made of a material having a reasonable strength, such as copper, brass, steel, alloy steel, and the like. While collet 21 is shown attached to the stationary workpiece 13, it could just as well be slipped about the rotating workpiece 17. However, when dissimilar metals or materials are to be joined, collet 21 should be placed about the material from which the greatest upset will flow. Thus collet 21 may be about a weaker material.

The circumferential groove or cutout 22 in collet 21 should be formed so that it is deeper than the amount of material shortening taking place in the workpiece about which it is disposed during the friction welding of this workpiece. The width of the cutout 22 limits the flow of upset outward from the workpieces. Some outward flow of upset must be allowed so the material of the workpieces will be plastic about the periphery of the weld area.

As shown in FIGURE 3, workpieces 17 and 13 of copper and aluminum, respectively, have been friction welded according to this invention. The collet 21 has served several functions.

The outer edge of the circumferential cutout 22 has physically limited the amount of upset to result in a saving of material in that the resulting upset 24 is greatly reduced. Second, collet 21 acts as a heat sink to produce a steep temperature gradient at the weld interface in the aluminum workpiece 13 about which the collect is placed. The weld area, or interface temperature may extend above the plastic temperature range for the aluminum workpiece 13, but the metal immediately adjacent to the weld interface will have a much smaller temperature rise than in conventional welding due to the steep temperature gradient produced at the interface or weld area by the heat sink effect of collet 21. This permits a considerably higher pressure to be used during welding. Third, the imposed constraint of collet 21 upon the upset 24 produces a more uniform pressure substantially across the entire weld area which results in a stronger and better quality joint. Fourth, for reasons which have been explained, there is a considerably narrowed heat affected zone.

As an example of the superior welds produced by this invention, copper and aluminum workpieces 17 and 13 which were ½ inch in diameter were conventionally friction welded. These workpieces failed in an impact test at 15 lb.-ft. Identical copper and aluminum workpieces 17 and 13 were friction welded using a collet according to this invention. When the workpieces were removed from chucks 11 and 14 and the collet 21 was removed from the welded workpiece 13, the welded workpieces resisted an impact test and did not fail until subjected to 53 lb.-ft.

As another example of this invention, ⅜ inch in diameter Inconel and Zircalloy workpieces were conventionally friction welded and other workpieces were friction welded according to this invention with a suitable collet 21 placed about the Zircalloy workpiece. The conventionally friction welded workpieces failed in tension at 41,000 p.s.i. while the workpieces welded according to this invention failed at 51,000 p.s.i.

Figure 4:
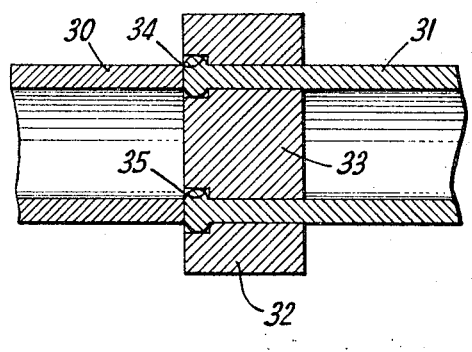
FIGURE 4 is a longitudinal section through fragments of two tubular workpiecs of dissimilar materials and through an upset controlling collet and plug according to this invention.

FIGURE 4 shows two tubular workpieces 30 and 31 which have been friction welded according to this invention. An outer collet 32 is disposed about workpiece 31 and an inner plug 33 is disposed within it. Collet 32 contains an annular groove 34 and plug 33 contains an annular groove 35. The grooves 34 and 35 are formed to be deeper than the shortening of workpiece 31 during friction welding. Their width is made to limit the extension of the upset produced and improve the weld quality in the same manner which has been described.

While this invention has been described as being applied to the friction welding of copper to aluminum workpieces and Inconel to Zircalloy workpieces, it may be used with any dissimilar workpieces to control excessive upset produced in one of the workpieces. While the collet 21 and the plug 33 have been shown as being merely disposed about or within the workpieces, they may be made as integral parts of the workpiece holding chucks and they may be used as conventional collets to secure or assist in securing workpieces.

What is claimed is:

1. In the process of friction welding dissimilar metal workpieces, one of which produces more upset than the other; the steps of placing a collet of heat conductive material in noncontacting and contacting tandem relationship with the end portion of the workpiece producing the most upset, said noncontacting relationship extending back from the end of the workpiece for a distance at least as great as the shortening of the workpiece during friction welding, urging said workpieces toward each other in butting relationship, and rotating one workpiece relative to the other.

2. In the process of friction welding dissimilar metal workpieces, one of which produces more upset than the other; the steps of placing a member of heat conductive material in contacting relationship with a surface of the workpiece producing the most upset with the member of heat conductive material containing a circumferential cutout extending back from and in noncontacting relationship with the end of the workpiece for a distance greater than the shortening of the workpiece during friction welding, urging said workpieces toward each other in butting relationship, and rotating one workpiece relative to the other.

3. In the process of friction welding copper and aluminum workpieces; the steps of placing a member of heat conductive material in contacting relationship with a surface of the aluminum workpiece with the member of heat conductive material containing a circumferential cutout extending back from and in noncontacting relationship with the end of the aluminum workpiece for a distance greater than the shortening of the aluminum workpiece during friction welding, urging said workpieces toward each other in butting relationship, and rotating one workpiece relation to the other.

4. In the process of friction welding Inconel and Zircalloy workpieces; the steps of placing a member of heat conductive material in contacting relationship with a surface of the Zircalloy workpiece with the member of heat conductive material containing a circumferential cutout extending back from and in noncontacting relationship with the end of the Zircalloy workpiece for a distance greater than the shortening of the Zircalloy workpiece during friction welding, urging said workpieces toward each other in butting relationship, and rotating one workpiece relative to the other.

5. In the process of friction welding dissimilar tubular metal workpieces, one of which produces more upset than the other; the steps of placing a first member of heat conductive material within the workpiece producing the most upset, said first member containing a circumferential cutout extending axially back from and in noncontacting relationship with the end of the workpiece for a distance greater than the shortening of the workpiece during friction welding, placing a second member of heat conductive material in contact with the outer surface of the workpiece producing the most upset, said second member containing a circumferential cutout extending axially back from and in noncontacting relationship with the end of the workpiece for a distance greater than the shortening of the workpiece during friction welding, urging said workpieces toward each other in butting relationship, and rotating one workpiece relative to the other.

References Cited

UNITED STATES PATENTS

| | | | |
|---|---|---|---|
| 2,795,039 | 6/1957 | Hutchins | 29—470.3 |
| 2,850,798 | 9/1958 | Bowman et al. | 29—486 X |
| 2,886,992 | 5/1959 | Barnes et al. | 29—470.1 X |
| 3,126,625 | 3/1964 | Laing | 29—475 X |
| 3,175,284 | 3/1965 | Cotovsky | 29—498 X |
| 3,234,643 | 2/1966 | Hollander | 29—470.3 |
| 3,235,312 | 2/1966 | Hollander | 29—490 X |

FOREIGN PATENTS

| | | |
|---|---|---|
| 492,068 | 4/1953 | Canada. |
| 875,603 | 8/1961 | Great Britain. |

JOHN F. CAMPBELL, *Primary Examiner.*

U.S. Cl. X.R.

29—493; 228—2